R. N. WHITCOMB.
FLYING MACHINE.
APPLICATION FILED FEB. 7, 1913.
1,109,889.
Patented Sept. 8, 1914.
8 SHEETS—SHEET 5.
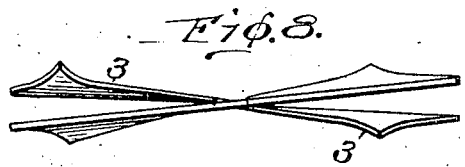
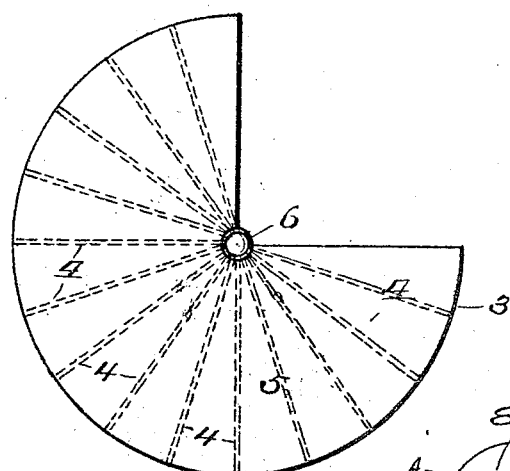
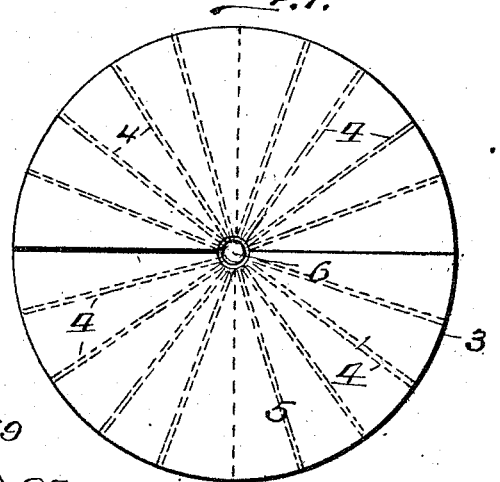
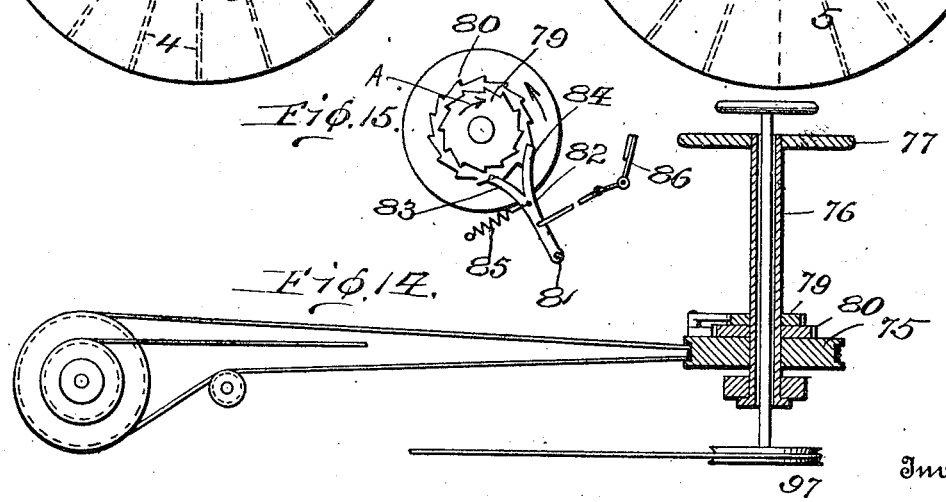
Witnesses
J. M. Fowler Jr.
Inventor
Ralph N. Whitcomb
By A. G. DuBois
Attorney R. N. WHITCOMB.
FLYING MACHINE.
APPLICATION FILED FEB. 7, 1913.
1,109,889.
Patented Sept. 8, 1914.
8 SHEETS—SHEET 6.
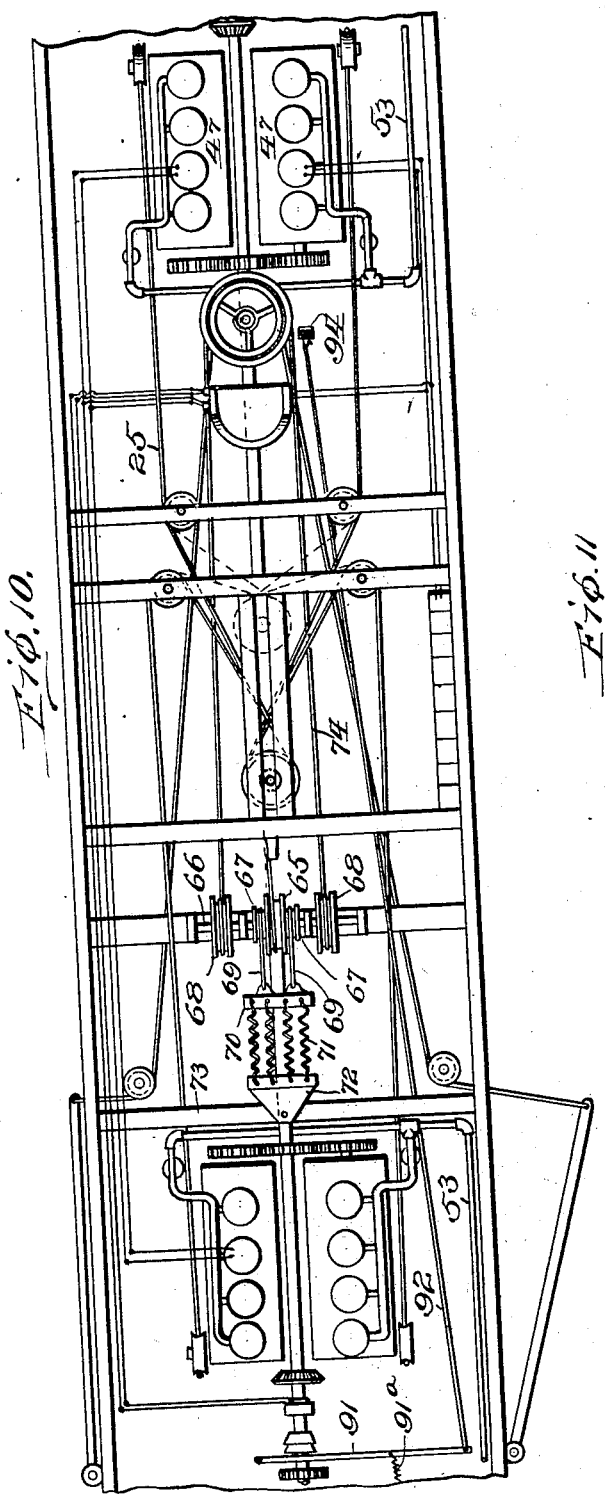
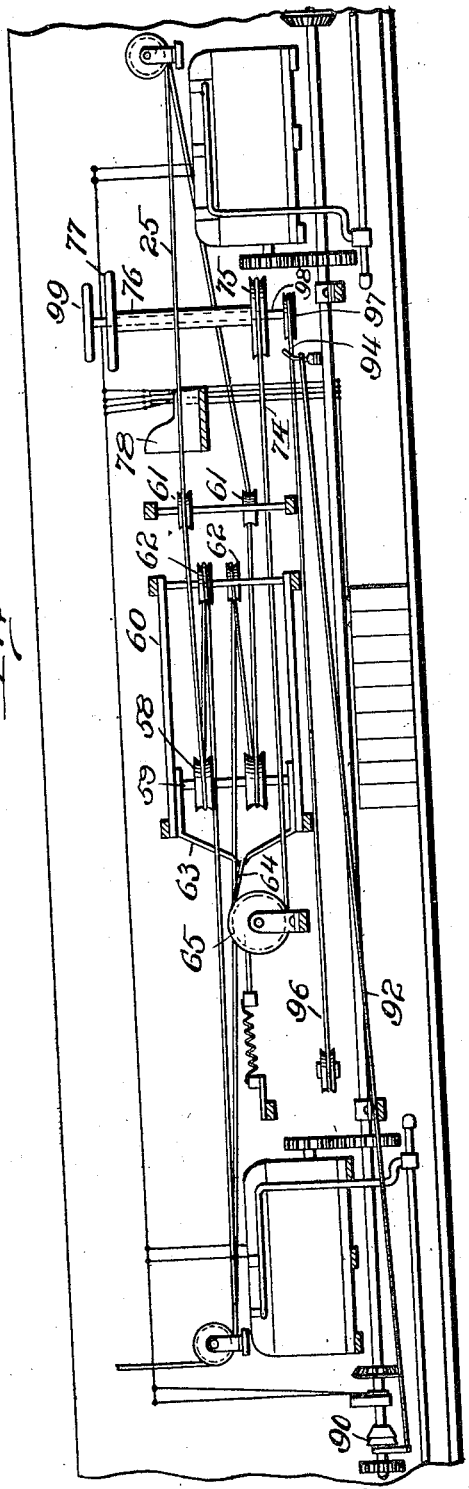
Witnesses:
J. M. Fowler Jr.
David A. Mesh
Inventor
Ralph N. Whitcomb
By A. J. DuBois Atty R. N. WHITCOMB.
FLYING MACHINE.
APPLICATION FILED FEB. 7, 1913.
1,109,889.
Patented Sept. 8, 1914.
8 SHEETS—SHEET 7.
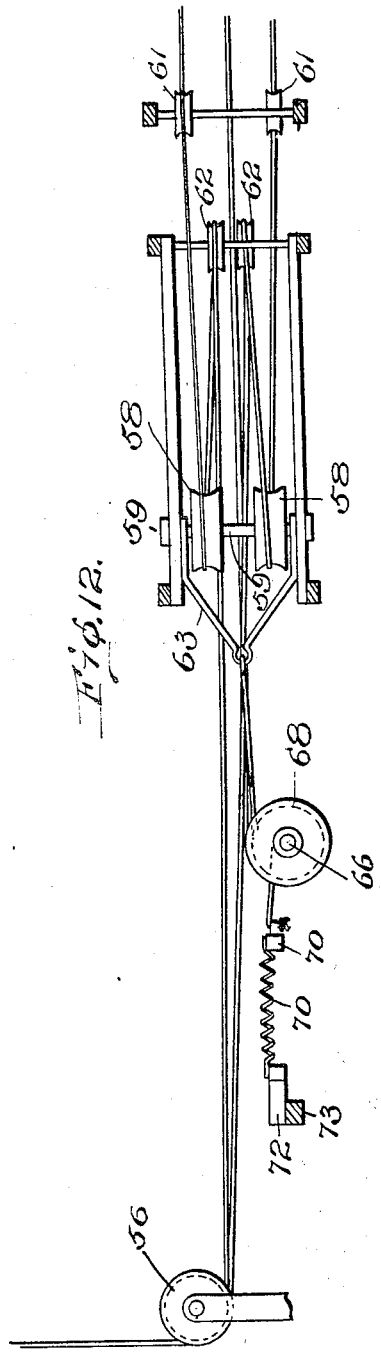
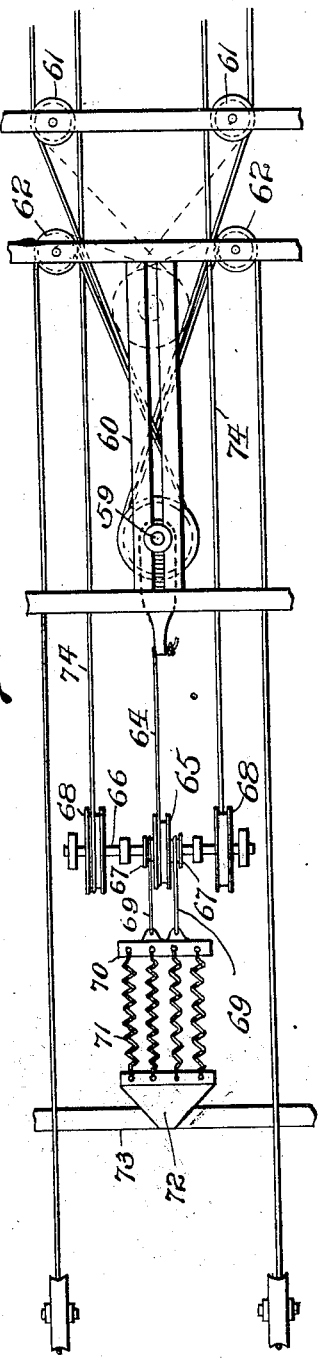
WITNESSES:
INVENTOR
Ralph N. Whitcomb
BY
ATTORNEY

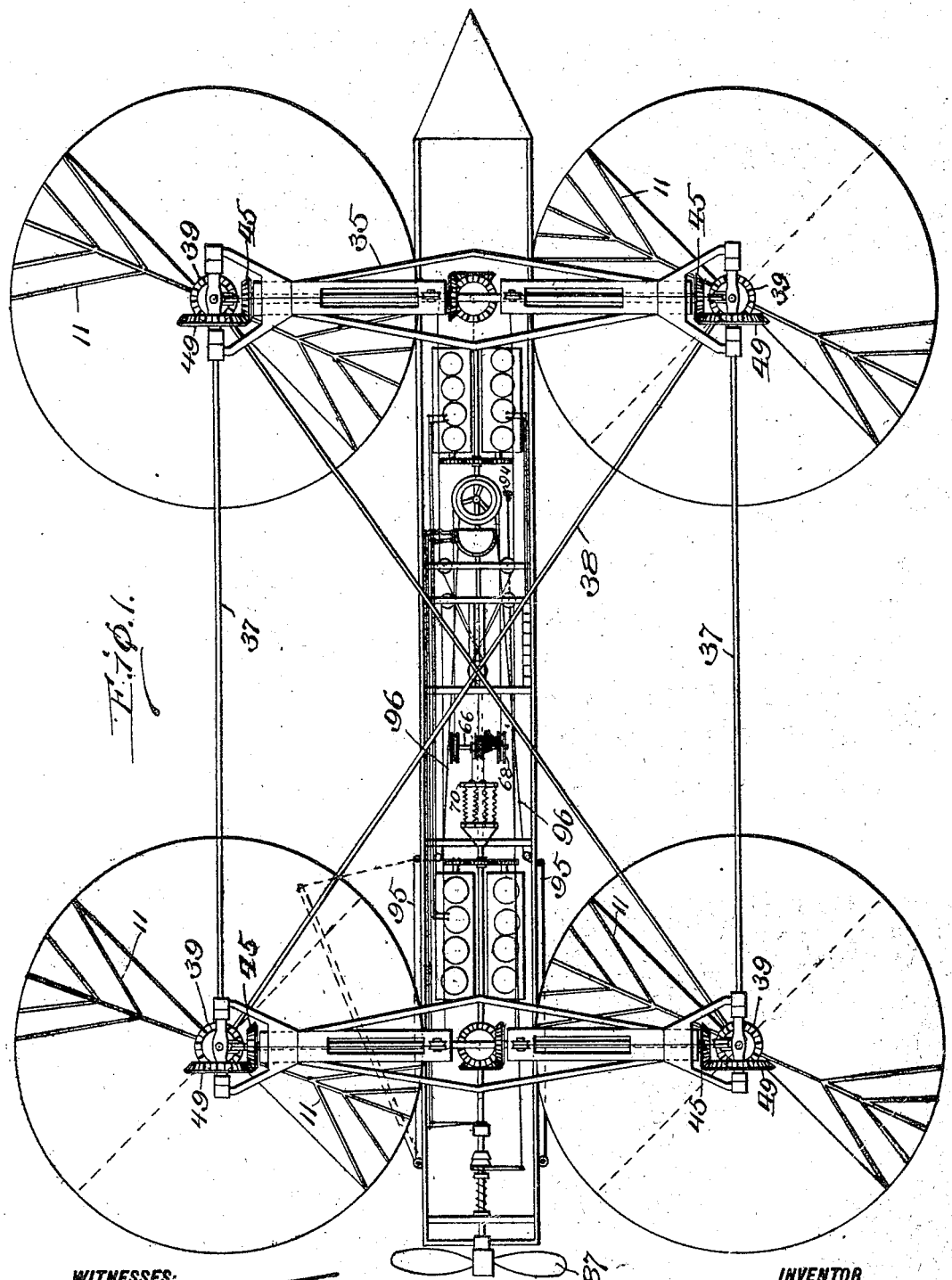

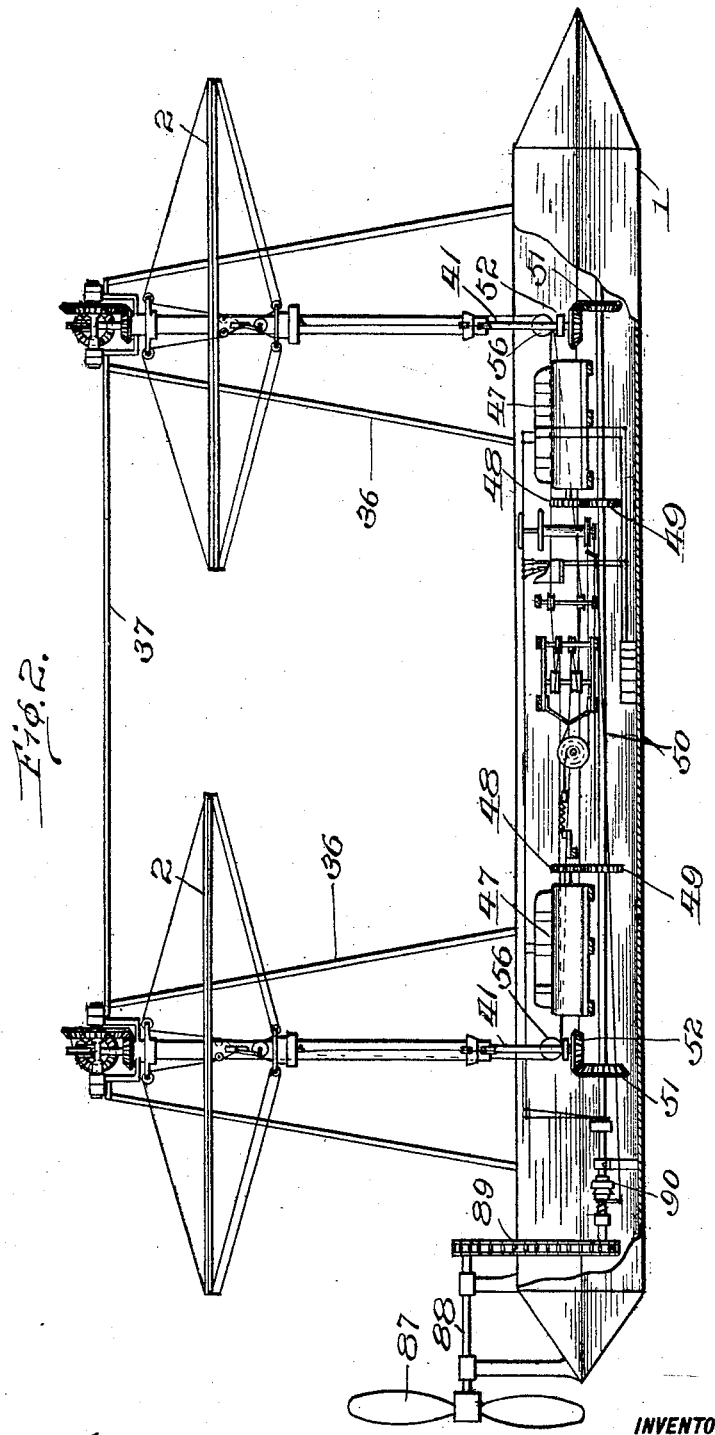

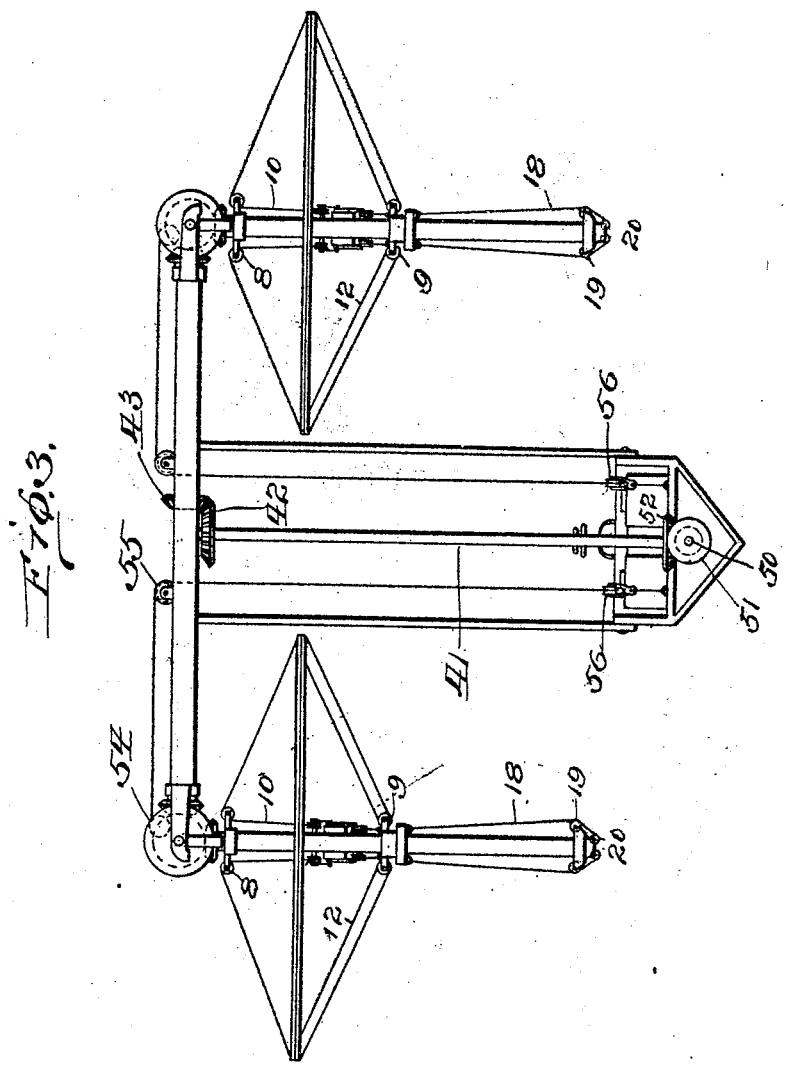

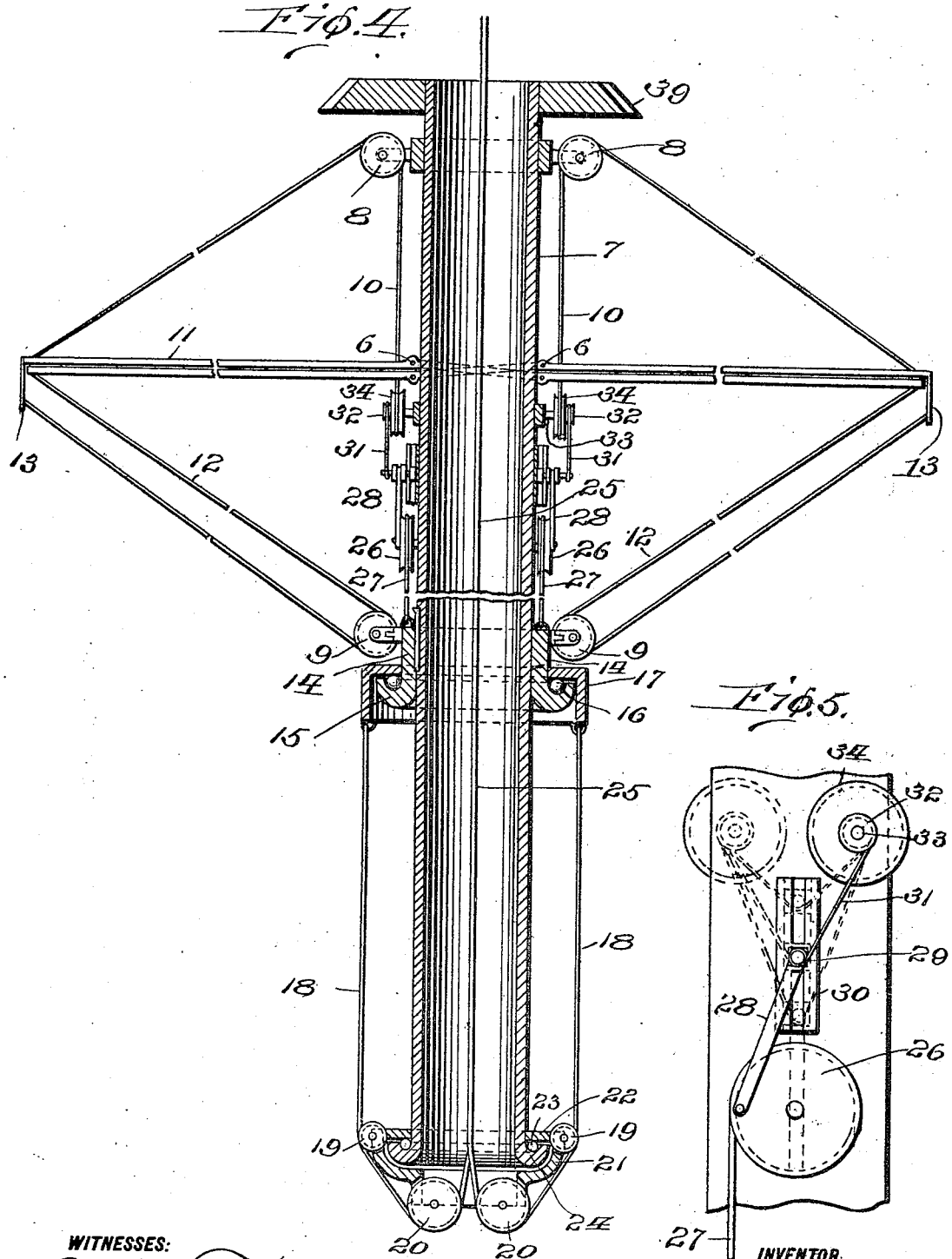

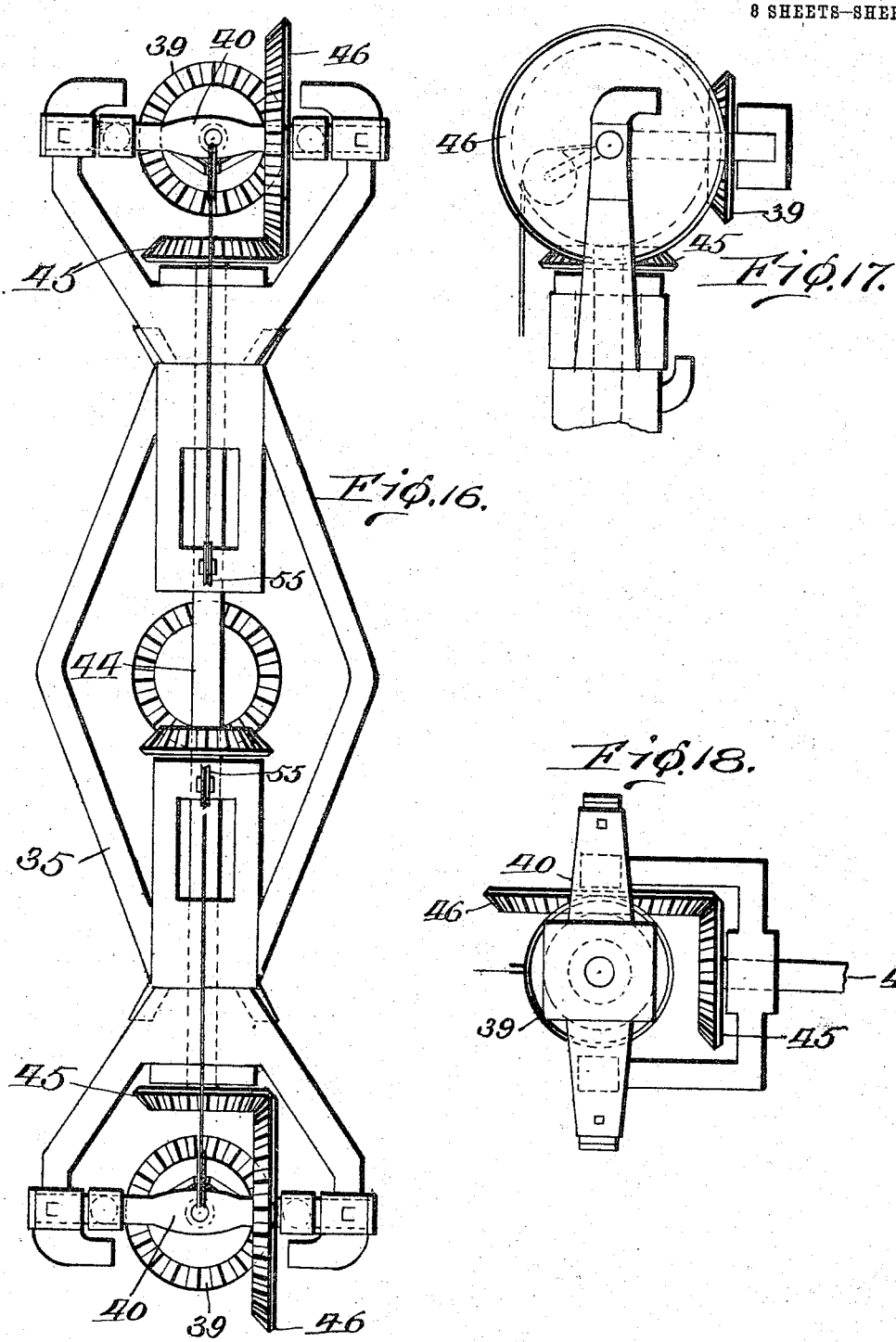

UNITED STATES PATENT OFFICE.

RALPH N. WHITCOMB, OF NEW YORK, N. Y.

FLYING-MACHINE.

1,109,889.    Specification of Letters Patent.    Patented Sept. 8, 1914.

Application filed February 7, 1913. Serial No. 746,821.

*To all whom it may concern:*

Be it known that I, RALPH N. WHITCOMB, a citizen of the United States, residing at New York City, in the county of New York and State of New York, have invented certain new and useful Improvements in Flying-Machines, of which the following is a specification.

This invention relates to flying machines, and it relates particularly to that class in which helicopters are utilized for raising and maintaining the structure suspended in the air.

The object which I have in view is to provide a flying machine in which are incorporated wings of such construction and so controlled by manual and automatic means that they shall be capable of being placed manually in such forms as to serve as helicopters for raising the ship with its appurtenances, passengers, freight, etc., and as gyroscopes and planes to insure the stability of the ship while suspended and propelled through the air, and which wings shall when freed from manual control be automatically moved into the forms of parachutes and be maintained in such forms, insuring the gradual and safe descent of the ship through the air when the wings have assumed this latter form.

The invention consists essentially of a flying machine comprising wings having the generic and specific features of form and arrangement of parts, substantially as hereinafter described and claimed, and it consists further of novel means for controlling and rotating the wings, and for steering the ship.

The invention is illustrated in the accompanying drawings in which:

Figure 1 is a plan view of one form of embodiment of the invention, showing a construction in which four sets of wings are employed; Fig. 2 is a side view of the air ship, one side of the body thereof being broken away to show the disposition of operative parts; Fig. 3 is an end view showing two sets of wings, with a portion of the means for driving and manipulating them; Fig. 4 is an enlarged view, partly in section particularly showing the form and arrangement of the parts for manipulating a set of wings; Fig. 5 is a detail view showing a portion of the means for working the wings; Fig. 6 is a plan view of one of the members of the wings; Fig. 7 is a plan view showing two members composing a wing arranged in operative position; Fig. 8 is a side view of a wing showing the component members with their edges warped; Fig 9 is a side view of a wing having the parts thereof placed in the form of a parachute; Fig. 10 is a fragmentary view showing the means for manually and automatically manipulating the wings, the means for driving the propeller and the means for connecting and disconnecting the driving means to and from the propeller; Fig. 11 is a fragmentary view in side elevation, showing the parts illustrated in Fig. 10; Fig. 12 is a plan view, and Fig. 13 is a side elevation of a part of the wing-operating mechanism; Fig. 14 is a detail view partly in side elevation and partly in section of the wing-operating and steering shafts and of the means for checking and permitting the rotation of the shafts; Fig. 15 is a detail view showing the means for locking and releasing the wing-operating shaft; Fig. 16 is a plan view of a portion of the supporting frame of the structure showing a portion of the means for rotating the wings; Fig. 17 is a detail view showing a part of the means for communicating motion to the wings; and, Fig. 18 is a detail view showing the means for driving the shafts on which the wings are mounted.

The air ship made in accordance with my invention may have the means for raising and propelling it arranged on a body of any suitable form. For instance as herein shown I employ a body 1 of any suitable material, which is preferably light, and which is in the form of a boat having pointed ends. The general contour of the body 1 is preferably such as to have sufficient displacement to float and sustain the operative parts of the ship with passengers, etc., when located on water.

In the construction of the ship I employ wings 2 for raising and sustaining the ship in the air, which are capable, by suitable manipulation, of performing other functions necessary in the operation of the device. In the present embodiment of the invention I have shown four wings arranged two at the front and two at the rear of the ship, though as will be clear from an understanding of the invention one, or more than four wings may be employed if desired, and the relative disposal of the wings may be widely varied without departing from the scope of my invention. The wings are each composed of two members 3 preferably constructed of ribs 4 of any suitable light flexible material upon which is taughtly stretched a covering 5 preferably of fabric. The ribs 3 are joined at the centers of the members to a ring 6 in any suitable way which will permit the up and down movements of the ribs and cover independently of the ring. Each member 3 has therein a sector-shaped opening of a size approximately one quarter of its surface, and the members are placed in close contact with each other, and in such positions that the covered portion of one member overlaps the open portion of its fellow.

In arranging the members in operative position the notched portion formed by the open space of each is brought into contact with that of the other and the flaps of each member are disposed one over one flap of the other member and the other under the other flap of the other member, as shown particularly in Fig. 8 of the drawing.

Each of the wings employed is secured to a hollow shaft 7 in any suitable way to cause the wing and shaft to rotate in unison, as by securing the ring 6 to which the ribs are attached to the shaft. Attached to each shaft 7 in a manner to rotate therewith, one on each side thereof and above the wing are pulleys 8, and similarly connected to the shaft and located below the wing are pulleys 9. Passing over the pulleys 8 are ropes 10 each of which is attached by branch ropes 11 to the upper portion or flap of the member uppermost at that side, adjacent to the open portion thereof. The relative lengths of the branch ropes 11 is such that the points of those portions of the flaps adjacent to the openings in the respective members shall be raised, on pulling the branch ropes, higher than the remaining portions of the flaps and that the edge when raised shall gradually descend from such points. Ropes 12 corresponding to the ropes 10 pass over the pulleys 9 and are connected each on its side of the shaft, one end to a bracket 13 attached to the edge of the member which is uppermost and at the other end by branch ropes 11 corresponding to those described, to the edge of the flap of the other member which is beneath that of its fellow member. When the respective ropes are drawn to warp the edges of the members of the wings, it will be seen from the described form and arrangement of the parts that one flap of each member will be drawn upward while the other flap thereof will be drawn downward, resulting in the production of a helicopter the pitch whereof depends upon the degree of distortion effected.

The pulleys 9 are attached to a collar 14 which is so connected to the shaft 7 by a key or otherwise as to rotate with such shaft, and be permitted to have a movement longitudinal thereof. Extending outward from the lower portion of the collar 14 is a flange 15 grooved in its upper face, and arranged in this groove are a series of anti-friction balls 16. Surrounding the flange 15 and resting upon the balls 16 is a ring 17 which is right angular in cross section, having an upper horizontal flange resting upon and being free to rotate upon the anti-friction balls 16. Connected with the collar 17 at opposite sides thereof are ropes or cables 18 respectively which extend downward from the collar over suitable pulleys 19 and 20 which are mounted on a collar 21 at opposite sides thereof. This collar 21 has a flange 22 which bears upon a series of anti-friction balls 23 arranged in a groove formed in a flange 24 extending from the lower end of the shaft 7. The ropes 18 after passing over the pulleys 19 and 20 are connected to a rope or cable 25 which extends to means for pulling or releasing such rope, which means will be described hereinafter.

Secured to each side of the shaft 7 is a wheel 26 which has attached to and passed around the periphery thereof, one end of a rope 27, and the other end of the rope is attached to the collar 14. Pivotally attached to the wheel 26 is one end of a pitman 28 the other end of which is pivoted to a block 29 sliding in ways 30 attached to the side of the shaft 7. Connected with the block 30 is one end of a rope 31 the other end of which is passed around the periphery of a pulley 32 and attached thereto. The pulley 32 is mounted rigidly on a shaft 33 extending from the shaft 7, and also rigidly attached to this shaft is a pulley 34 of larger diameter than the pulley 32. The rope 10 is given a few turns around the periphery of the pulley 34 and then is attached thereto.

From the described arrangement it will be clear that, assuming the members of the wings to be in positions to lie in horizontal positions, closely against each other, should the rope or cable 25 be drawn upward through the hollow shaft, the result will be that the collar 14 will be drawn downward on the shaft 7 a short distance. This will result in pulling on the ropes 12, thereby warping the lower flaps of the respective wings. Inasmuch as the mechanism described for connecting the collar with the ropes 10 results in moving the latter ropes a greater distance than the collar 14 is moved, the described movement of the rope or cable 25 will result in moving upward, or warping the upper flaps of the respective wings to a greater extent than the lower flaps. The result is that the distortion of the upper flaps of the wings is greater than that of the lower ones, producing a helicopter formed by the upper flaps in the positions of spirals of high pitch with the lower flaps of the wings in the positions of spirals of a lower pitch. The difference between the pitch of the upper and lower flaps may be governed by changes in the relative diameters of the pulleys 32 and 34.

When the wings are in the positions described and are revolved through the medium of the shaft 7 at a high velocity, great lifting power is developed. It will be understood from the described arrangement of the parts that the shaft and the parts attached thereto may rotate freely without rotating the collars 17 and 21, and the parts connected thereto, the anti-friction balls interposed between the collar 14 and the ring 17 and between the flange 24 on the shaft and the collar 23, allowing the rotation of the shaft without the rotation of the ring 17 and the collar 22.

A continued upward movement of the rope or cable 25 after the warping of the members of the wings will result in pulling downward on the ropes 12 bringing the edges of the wings downward and inward to form parachutes. The said continued movement of the rope or cable 25 results in drawing downward the collar 14 which through the ropes 27 rotate the wheels 26, carries the ends of the pitmans 28 beyond the center of the wheels 26, and a continued rotation of such wheels by the downward movement of the collar 14 will result in an upward movement of the pitmans thus slacking the ropes 10 and permitting the drawing downward of the edges of the wings by the action of the ropes 12.

The shaft 7 is supported at its upper end in one end of a truss or frame 35, one of which, in the present form of the device is arranged at each end of the ship, and is supported upon a frame consisting of uprights 36 longitudinal brace rods 37 and transverse braces 38. Fixed to the upper end of the shaft 7 is a gear 39, the lower face of which bears upon and is supported by a transverse bar 40 secured to the end of the truss frame 35.

Motion is imparted to the shafts 7 from an upright shaft 41 having at its upper end a beveled gear 42 which meshes with a corresponding gear 43 on a shaft 44. The respective ends of the shaft 44 terminate adjacent to the gears 39 on the shafts 7 and have at each end a beveled gear 45 which meshes with a gear 46 maintained in mesh with the gear 39 on the shaft 7. Rotation of the shaft 41 will result through the described connections in rotating the respective shafts 7, connected with the shaft 41, in opposite directions. As herein shown two wings are arranged at each end of the machine and the gear for driving the wings is so arranged that diagonally opposite wings are driven in opposite directions in order to prevent gyration of the car while suspended in the air and to neutralize any tendency to deflect the course of the air ship when suspended in the air by the action of the wings.

Motion is imparted to the driving shafts 41 in any suitable way. In the present embodiment of the invention I have shown two internal combustion engines 47 located respectively adjacent to the front and rear ends of the body of the shaft. The driving shafts of the motors have each fixed to them a gear wheel 48 each of which meshes with a corresponding gear wheel 49 fixed to a line shaft 50 located in suitable bearings and extending from end to end of the body of the ship. Fixed to this shaft 50 at points beneath the respective shafts 41 are beveled gear wheels 51 which mesh with corresponding gear wheels 52 fixed to the lower end of each of the shafts 41. The supply of gasolene or the like for furnishing fuel to the engine is stored in suitable tanks in the extreme forward and rear ends of the body and connection between such storage tanks and the motors is had through suitable connections 53.

The ropes or cables 25 each pass upward through a hollow shaft 7 thence over pulleys 54 arranged adjacent to the tops of the shafts 7 then toward the center of the truss frame and over pulleys 55 then downward and over pulleys 56 arranged near the lower ends of the shafts 41, from which point they pass to and around the pulleys 58 fixed to a shaft 59. The shaft 59 has bearings in a slotted support 60 in which the shaft is capable of moving back and forth. The arrangement of the ropes or cables 25 is such that a continuous rope or cable passes from each shaft 7 to the diagonally opposite shaft. To accomplish this a rope or cable passes over a pulley 58 and one end thereof passes over a suitable guide pulley 61 and thence to a forward shaft 7 on one side of the ship, while the other end of the cable passes over a pulley 62 and thence rearward to a rear shaft on the other side of the ship.

Attached to the shaft 59 near the ends thereof is a bail 63, and attached to this bail is a rope or cable 64 which is passed around and has one end attached to a pulley 65 fixed to a shaft 66 stationarily mounted in the body of the ship. Also fixed to the shaft 66 are two small pulleys 67 and two larger pulleys 68. The pulleys 67 have coiled about and attached to them one end each of the ropes or cables 69, the other ends of which are attached to a bar 70. The bar 70 has connected with it a series of powerful coil springs 71 normally maintained under tension, the other ends of which are attached to a bracket 72 secured to a rigid cross piece 73 or any other stationary portion of the ship. A rope or cable 74 has one end attached to one of the pulleys 68 around which it is passed and the other end is attached to the other pulley 68 and passed around the same in a direction opposite to that in which the other end of the rope is passed around the first pulley 68. The middle portion of the rope or cable 74 is given a few turns around a drum 75 which is fixed to a hollow shaft 76 which shaft has attached to it a hand wheel 77, the shaft 76 and the hand wheel being located adjacent to a drivers seat 78 located in any suitable position in the body of the ship. The hollow shaft 76 has attached to it two ratchet wheels 79 and 80, and pivoted on a suitable support 81 adjacent to the shaft 76 is a pawl 82 having two arms 83 and 84 adapted to engage the teeth on the ratchets 79 and 80 respectively.

The teeth on the ratchet wheels are inclined in opposite directions and thus the rotation of the shaft in one direction is checked by bringing one of the pawls into contact with its ratchet wheel, and in the other direction by bringing the other pawl into play. Attached to the arm of the pawl 82 is a spring 85 which tends normally to keep the pawl 84 in engagement with the teeth of the ratchet 80, and also attached to the arm of the pawl by a suitable connection is a foot lever 86, the parts being so arranged that by pressure on the foot lever 86 the spring 85 will be overcome, the pawl 84 removed from engagement with the teeth of the ratchet 80 and the arm 83 of the pawl brought into engagement with the teeth of the ratchet 79.

The normal position of the pawl is with the arm 84 thereof in contact with the ratchet 80 in which position it is held by the spring in a manner to prevent the turning of the shaft in the direction indicated by the arrow A in Fig. 15. If the arm 84 be released from contact with the ratchet 80 the shaft 76 may be rotated in the direction indicated by the arrow in Fig. 15, thereby putting the springs 71 under tension. The rotation of the shaft in the described direction unwinds the rope 64 from the pulley 65, and consequently the several wing governing ropes are slackened. Inasmuch as the pawl 82 is brought into contact with the ratchet 79 simultaneously with the removal of the pawl 84 from the ratchet 80, the turning of the shaft 66 under the impulse of the springs in a direction to draw upon the governing ropes is prevented so long as pressure is applied to the foot lever 86. Upon releasing the foot lever the pawl 79 is withdrawn from engagement with the ratchet 83, and when the parts are in this position the rotation of the shaft 66 by the impulse of the springs in a direction to wind the rope 64 on the pulley is permitted and thus through the described connections drawing the respective wing-operating ropes upward through the hollow shafts 7 resulting first in warping the edges of the flaps of the wings, and, if the movement is permitted to continue, drawing down the outer edges of the wings forming parachutes.

A propeller 87 is mounted in suitable bearings at the rear end of the body 1 of the ship, and its shaft 88 is connected in any suitable way with the main driving shaft 50. For instance, the ends of the respective shafts may be provided with sprocket wheels over which passes an endless drive chain 89. The shaft 50 has interposed in it adjacent to its rear end a clutch 90 whereby such rear end bearing the sprocket wheel may be connected to or disconnected from the main portion of the shaft in order that the shaft 50 may rotate continuously and the propeller be stopped or started at will.

A lever 91 for governing the clutch is mounted adjacent to the latter, and is maintained normally in position to connect the main part of the shaft 50 with the rear end thereof, by a spring 91ª. The lever 91 is connected by a rod 92 with a foot lever 94 located adjacent to the driver's seat in such a manner that by pressure on the foot lever the clutch is operated to free the rear end of the shaft thus disconnecting the propeller.

The steering of the ship may be accomplished by any means. Herein I have shown two vanes 95 each pivotally connected at its rear end to the outer face of the body 1 of the ship near the rear end thereof and each having attached to its forward end a rope 96 which passes around a pulley 97 rigidly secured on the end of a shaft 98 located in the hollow shaft 76. The shaft has fixed to it a hand wheel 99 by the turning of which the forward end of one of the vanes 95 is drawn toward or against the side of the ship while the other vane is released. The effect of releasing a vane is to allow it to swing outward by reason of the pressure of the air upon it as the ship moves through the air, and when in this position it will tend to check the progress of that side of the ship on which it is located. The result is that the course of the ship is directed toward that side at which a vane projects or to that side at which the vane projects farther than that on the opposite side.

In the operation of the ship motion being given the main driving shaft the wings will be rotated, and by releasing the shaft 76 from control of the pawl 84 the hand-wheel may be turned in the direction indicated by the arrow in Fig. 15 to slacken the control ropes 25. The rotation of the wings and resulting centrifugal force, will tend to raise them from their normal positions of parachutes toward those of planes. As the wings approach positions to form planes they will be checked by the control and branch ropes and consequently their edges will be warped to cause each wing to assume the form of a helicopter.

When the ship has been raised to the desired altitude the control ropes may be further slackened by turning the shaft 76 in the direction indicated by the arrow. This further slackening, through the described connection and arrangement of the parts allows the wings by reason of the pressure of air on their under faces to assume the forms of planes and to cause the ship to glide through the air under the impulse of the propeller, and the stability of the ship is assured by reason of the gyroscopic action of the revolving wings. If when the wings are in either the form of helicopters or planes the operator should lose control and the foot lever be released, the pawl 83 would be released from the ratchet 79 and the springs would immediately through the described mechanism draw upon all the governing ropes 25 and bring all the wings into the form of parachutes. Should more power than that exerted by the springs be necessary to draw down the edges of the wings to form parachutes, the shaft 76 may be turned manually in a direction opposite to that indicated by the arrow A in Fig. 15 until the desired shape of wings is attained. When the wings have thus been formed and the action of the propeller checked, the ship will gradually descend and alight without injury.

I claim;

1. In a flying machine a wing composed of members each of which has an opening therein, the members being so arranged that each forms a part both of the upper and of the lower face of the wing.

2. In a flying machine a wing composed of members each of which has an opening therein, the members being so arranged that the covered portion of each overlaps the opening in the other, and the parts of the respective members being so placed that one part of each forms a portion of the upper face of the wing and another part forms a portion of the lower face thereof.

3. In a flying machine a circular wing composed of members each of which has a sector-shaped opening therein, one part of each member adjacent to the opening being passed upwardly through the opening in the other member and then along in contact therewith, whereby each member is caused to constitute a portion of both the upper and lower faces of the wing.

4. In a flying machine a wing composed of members each formed of flexible ribs and a covering attached to the ribs, the members each having an opening therein through which extends a portion of the other member, such portions being disposed to lie along and in contact with the other member, whereby a flexible wing composed of members each of which forms a part both of the upper and under face thereof is formed.

5. In a flying machine a wing composed of members each of which has an opening therein, the parts of the respective members being so disposed in respect of each other that each member forms a part both of the upper and lower surface of the wing, and means for warping the parts of the members adjacent to the openings.

6. In a flying machine a wing composed of flexible members each of which has a portion thereof arranged above and another arranged below the other member, operating ropes attached to both the upper and lower faces of the members and means for drawing on such ropes whereby the edges of the members are warped.

7. In a flying machine a wing composed of members each of which has an opening therein, the parts of the respective members being so disposed in respect of each other that each member forms a part both of the upper and lower surfaces of the wing, a series of ropes attached to the members at each side thereof and means for drawing on such ropes.

8. In a flying machine a wing composed of members each of which has an opening therein, the parts of the respective members being so disposed in respect of each other that each member forms a part both of the upper and lower surfaces of the wing, a series of ropes of different lengths attached to the members at each side thereof and means for drawing on such ropes.

9. In a flying machine a wing composed of flexible members each of which has a portion thereof arranged above and another arranged below the other member, operating ropes attached to both the upper and lower faces of the members, means for increasing the movement of the ropes attached to the upper faces relatively to those attached to the lower faces, and means for drawing on the operating ropes.

10. In a flying machine a flexible circular wing attached to a revoluble shaft by means permitting up and down movement of the wing independently of the shaft, ropes connected with the wing and located below the same and means for drawing on such ropes whereby the wing will be caused to form a parachute.

11. In a flying machine a flexible wing attached to a revoluble shaft, a ring attached to the shaft by means permitting the revolution of the shaft independently of the ring, a connection between the ring and the edge of the wing, and means for moving the ring longitudinally of the shaft.

12. In a flying machine a flexible wing attached to a revoluble hollow shaft, a ring attached to the shaft by means permitting the revolution of the shaft independently of the ring, a connection between the ring and the edge of the wing, and an operating rope passing through the hollow shaft and connected to the ring.

13. In a flying machine a flexible wing, a revoluble shaft to which the wing is connected, a collar attached to the shaft, a ring supported on the collar by means permitting the turning of the shaft and collar independently of the ring, a connection between the collar and the wing, and an operating rope attached to the ring.

14. In a flying machine a flexible wing, a revoluble hollow shaft to which the wing is connected, a collar attached to the shaft, a ring supported on the collar by means permitting the turning of the shaft and collar independently of the ring, a connection between the collar and the wing, and an operating rope passing through the hollow shaft and attached to the ring.

15. In a flying machine a flexible wing, a revoluble shaft to which the wing is connected, a collar attached to the shaft by means to cause it to rotate therewith and to allow movement longitudinally on the shaft of the collar, a connection between the collar and the edge of the wing, a ring mounted on the collar by means permitting the rotation of the collar independently of the wing, and an operating rope attached to the ring.

16. In a flying machine a flexible wing, a revoluble shaft to which the wing is attached, a flanged collar connected to the shaft in a manner to rotate therewith and to have movement longitudinally thereof, antifriction balls arranged on the flange of the collar, a ring surrounding the collar and having a flange resting on the anti-friction balls, whereby rotation of the collar independently of the ring is permitted, a connection between the collar and the edge of the wing, and an operating rope attached to the ring.

17. A flying machine comprising a revoluble shaft a collar connected with the shaft in a manner to rotate therewith and to have a movement longitudinally of the shaft, a ring arranged around the collar in a manner to permit the rotation of the collar independently of the ring, a flexible wing composed of two parts one imposed upon the other, a rope connecting the collar and both the upper and lower portions of the wings, and an operating rope attached to the ring.

18. A flying machine comprising a revoluble shaft a collar attached to the shaft in a manner to rotate therewith and to have motion longitudinally of the shaft, a wing composed of two parts and attached to the shaft, a connection between the collar and the upper portion of the wing, and a second connection between the collar and both the upper and lower portions of the wing, and means for moving the collar longitudinally on the shaft.

19. A flying machine comprising a revoluble shaft, a collar attached to the shaft in a manner to rotate therewith and to have motion longitudinally of the shaft, a ring arranged on the collar in a manner to permit the rotation of the collar independently of the ring, a wing composed of two parts and attached to the shaft, a connection between the collar and the upper portion of the wing, and a second connection between the collar and both the upper and lower portions of the wing, and an operating rope attached to the ring.

20. A flying machine comprising a revoluble shaft a collar arranged on the shaft in a manner to rotate therewith and to have movement longitudinally of the shaft, a ring arranged on the collar in a manner to allow the collar to rotate independently of the ring, a wing composed of two parts attached to the shaft, a connection between the collar and the upper portion of the wing, such connection having interposed in it means whereby the connection with the wing is moved a greater distance than the collar, and an operating rope connected with the ring.

21. A flying machine comprising a revoluble shaft, wings attached to the shaft by a hinge connection, an operating rope connected to the edges of the wings, and springs attached to the operating rope.

22. A flying machine comprising a revoluble shaft, wings attached to the shaft by a hinge connection, an operating rope connected to the edges of the wings, springs attached to the rope, and means for placing and maintaining the wings under tension and for releasing them.

In testimony whereof I have affixed my signature in presence of two witnesses.

RALPH N. WHITCOMB.

Witnesses:
 MARGARET RETHY,
 L. R. SCHENCK.